(12) United States Patent
Jha et al.

(10) Patent No.: US 9,558,300 B2
(45) Date of Patent: Jan. 31, 2017

(54) STOCHASTIC COMPUTATIONAL MODEL PARAMETER SYNTHESIS SYSTEM

(71) Applicants: The University of Central Florida Research Foundation, Inc., Orlando, FL (US); Carnegie Mellon University, Piitsburgh, PA (US)

(72) Inventors: Sumit K. Jha, Oviedo, FL (US); Christopher J. Langmead, Monroeville, PA (US)

(73) Assignees: Carnegie Mellon University, Pittsburg, PA (US); The University of Central Florida Research Foundation, Inc., Orlando, FL (US)

( * ) Notice: Subject to any disclaimer, the term of this patent is extended or adjusted under 35 U.S.C. 154(b) by 757 days.

(21) Appl. No.: 13/673,575

(22) Filed: Nov. 9, 2012

(65) Prior Publication Data

US 2013/0124164 A1 May 16, 2013

Related U.S. Application Data

(60) Provisional application No. 61/558,640, filed on Nov. 11, 2011.

(51) Int. Cl.
*G06F 7/60* (2006.01)
*G06F 17/50* (2006.01)

(52) U.S. Cl.
CPC ........... *G06F 17/50* (2013.01); *G06F 2217/10* (2013.01)

(58) Field of Classification Search
CPC .............................. G06F 17/50; G06F 2217/10
USPC ............................................................ 703/2
See application file for complete search history.

(56) References Cited

U.S. PATENT DOCUMENTS

| | | | | |
|---|---|---|---|---|
| 5,831,864 A * | 11/1998 | Raghunathan | ...... | G06F 17/5045 716/104 |
| 6,314,390 B1 * | 11/2001 | Bittner et al. | ................... | 703/14 |
| 6,768,972 B1 * | 7/2004 | Schaffler | ............ | G05B 23/0221 702/189 |
| 2005/0091294 A1 * | 4/2005 | Tuken et al. | ................. | 708/200 |
| 2006/0229753 A1 * | 10/2006 | Seskin | ............... | G06F 17/5009 700/97 |

(Continued)

OTHER PUBLICATIONS

Donaldson et al. ("A Model Checking Approach to the Parameter Estimation of Biochemical Pathways",Springer-Verlag,2008, pp. 269-287).*

(Continued)

*Primary Examiner* — Omar Fernandez Rivas
*Assistant Examiner* — Iftekhar Khan
(74) *Attorney, Agent, or Firm* — Dunlap Codding, P.C.

(57) ABSTRACT

A stochastic computational model parameter synthesis system comprising at least one processor capable of executing processor executable code, and a non-transitory computer memory operably coupled with the at least one processor and storing processor executable code, which when executed by processor, causes processor to synthesize at least one parameter of a stochastic computational model to satisfy one or more behavioral specifications of properties observed in a modeled system. The processor generates and searches randomized projections of a first parameter space having n dimensions into one or more second abstract parameter space having d dimensions, where d is less than n, and outputs a signal indicative of a synthesized parameter value to the user.

13 Claims, 4 Drawing Sheets

(56) References Cited

U.S. PATENT DOCUMENTS

| | | | | |
|---|---|---|---|---|
| 2006/0229854 A1* | 10/2006 | Grichnik | ............ | G06F 17/5009 |
| | | | | 703/2 |
| 2007/0094048 A1* | 4/2007 | Grichnik | ............ | G06F 19/3431 |
| | | | | 705/2 |
| 2007/0203864 A1* | 8/2007 | Grichnik | ............... | G05B 17/02 |
| | | | | 706/44 |
| 2007/0244678 A1* | 10/2007 | Averill | ...................... | G06F 8/20 |
| | | | | 703/7 |
| 2007/0282579 A1* | 12/2007 | Dempster | ............... | G06F 17/11 |
| | | | | 703/6 |
| 2009/0024367 A1* | 1/2009 | Grichnik | ............ | G06F 17/5009 |
| | | | | 703/2 |
| 2009/0112534 A1* | 4/2009 | Gilg | .................... | G05B 13/024 |
| | | | | 703/2 |
| 2009/0132216 A1* | 5/2009 | Grichnik et al. | ................ | 703/2 |

OTHER PUBLICATIONS

Frangos et al. ("Surrogate and reduced-order modeling: a comparison of approaches for large-scale statistical inverse problems",John Wiley & Sons,2001, pp. 1-27).*

Jha et al. ("A Bayesian Approach to Model Checking Biological Systems",Springer-Verlag,2009, pp. 218-234).*

Johanneset al. ("MCMC Methods for Continuous-Time Financial Econometrics",University of Chicago,2003, pp. 1-96).*

Baier et al. ("Symbolic model checking for probabilistic processes. InICALP 1997. LNCS, vol. 1256, pp. 430-440. Springer, Heidelberg (1997)").*

Batt et al. ("Validation of qualitative models of genetic regulatory networks by model checking: analysis of the nutritional stress response in *Escherichia coli*", Oxford University Press, 2005, pp. i19-i28).*

* cited by examiner

STOCHASTIC COMPUTATIONAL MODEL PARAMETER SYNTHESIS SYSTEM

BACKGROUND

The development of stochastic computational models is becoming increasingly important in many areas of engineering, finance, medicine, economics, social and physical sciences. Very often, the overall structure of such computational models can be obtained from first principles by using our understanding and insight into the physical system that is being modeled. For example, a computational model for programmed cell death or apoptosis may include a number of biochemical reactions that have been studied in the scientific literature on apoptosis. A model for stability control in a car may be obtained from the engineering design of the vehicle.

However, several components of a stochastic computational model are not readily obtained from first principles. Very often, model designers incorporate such information in the computational model as parameters. Stochastic computational model parameters are variables in the model, whose values do not change during the model simulation. The model designer chooses these parameter values carefully so that the computational model replicates the behavior of the physical system being modeled.

As the size of a stochastic computational model grows, the number of parameters used to describe the model also increases. The model designer chooses the values of all these parameters before the model can be simulated. The problem is further aggravated by the fact that the number of possible values of these parameters is exponential in the number of parameters themselves. Hence, the designer is faced with the daunting chance of choosing a parameter value from a very large number of possible parameter values, referred to as the problem of parameter space explosion. It is very difficult for her to manually explore the exponentially large space of parameter values.

Model designers often use "thumb rule" assumptions obtained by years of experience in developing stochastic computational models to synthesize the values of model parameters. These assumptions are often not based on a sound mathematical framework, but are merely heuristic simplifications that make the parameter synthesis problem tractable. However, the result of such heuristic parameter synthesis based on "thumb rules" is not complete. A complete parameter synthesis system finds a parameter value if one exists. A model designer using such a heuristic approach can never prove that a given model is fundamentally flawed, and no choice of parameter values can enable the computational model to satisfy the behavioral observations obtained from the system being modeled. The ability to generate such a proof is fundamental to the process of model development where inaccurate models are identified rapidly. Another simplification often used by model designers is to perform local sensitivity analysis of the parameters of the model. Local sensitivity analysis does not provide much information about the global behavior of the model. On the other hand, global sensitivity is difficult to compute even for moderate size computational models.

The correct value of parameters for a computational model can be obtained by exhaustively enumerating all the possible values of the parameters in the model. As the number of parameter values is exponential in the number of parameters, this approach is infeasible.

TOKEN, T. and CAREY, D. M. (2005) System for estimating model parameters, U.S. Patent Application Publication No. 2005/0091294, discloses a system for estimating a set of mathematical model parameters. In this system, the design consists of a sensor configured to produce data and a control circuit that produces at least one parameter. The control circuit estimates the set of mathematical model parameters based on an updated data matrix. The system is an online parameter estimation system and does not scale to massively parallel computing platforms and hundreds of parameters.

Calvin J. Bittner, E. J. V., James P. Hoffmann, C. V., and Josef S. Watts, S. B. V. (2001) Method of determining model parameters for a Metal-Oxide-Semiconductor Field-Effect Transistor (MOSFET) compact model using a stochastic search algorithm, U.S. Pat. No. 6,314,390 discloses a method of determining a set of parameters for modeling an active semiconductor device, for example, MOSFETs. The system uses genetic evolution of fitness vectors to determine a suitable choice of parameter values. Vectors of best fitness are selected and at least one genetic operator is applied to create new vectors. The process is repeated until a satisfactory set of parameters is obtained.

"Synthesis and infeasibility analysis for stochastic models of biochemical systems using statistical model checking and abstraction refinement" (Sumit Kumar Jha and Christopher James Langmead) discloses a system for automatically synthesizing the set of all kinetic parameters such that a given biochemical model satisfies a given high-level behavioral specification. The system integrates statistical model checking with abstraction refinement, and can also report the infeasibility of the model if no such combination of parameters exists. The system has been used to synthesize as many as 11 parameters of a biochemical model as it potentially needs to explore an exponential number of parameter values.

Accordingly, what is desired, and not heretofore been developed, is a stochastic computational model parameter synthesis system that can synthesize parameter values of a stochastic model that enable the model to satisfy a given behavioral specification, wherein randomized projections of the parameter space are built in a distributed manner and only a polynomial number of parameter values are explored before the system stops.

SUMMARY

A stochastic computational model parameter synthesis system for stochastic computational models is described. Our proposed system allows us to synthesize approximately correct parameter values for computational models by exhaustively exploring only a polynomial number of parameter values. Our system ensures that the distance between the synthesized approximately correct parameter values and the optimal parameter values is bounded. Thus, our methodology trades off an exponential number of computations in favor of guaranteed approximate optimal parameter values.

In some embodiments, the stochastic computational model parameter synthesis system can synthesize parameters of stochastic computational models that enable the computational model to satisfy a behavior observed in the system being modeled. The stochastic computational model parameter synthesis system can synthesize model parameters by (1) receiving stochastic models of a system, behavioral specifications of the system being modeled, and the space of model parameters; (2) generating parallelized randomized projections of the parameter space that probabilistically preserve the optimal value of the model parameter; (3) exhaustively exploring a low dimensional randomized projection of the parameter space by using a parallel computing system; (4) mapping the low dimensional abstract parameters to the high dimensional parameter space; and (5) exploring the model with obtained high dimensional parameter values to determine the probability with which the computational model satisfies the behavioral specification learnt from the system being modeled. In some embodiments, the stochastic computational model parameter synthesis system can also prove the absence of any parameter values that enable the stochastic model to satisfy the behavior observed in the system being modeled. The stochastic computational model parameter synthesis algorithm ensures that the synthesized parameters enable the computational stochastic model to satisfy the behavioral specification observed in the system being modeled.

It is an object of the inventive concepts disclosed herein to provide a system and method of parameter synthesis that investigates only a polynomial number of model parameters values before the parameter synthesis system stops. If n is the number of model parameters, the number of model parameter values explored is polynomial in n.

It is an object of the inventive concepts disclosed herein to provide a means of synthesizing parameters of the stochastic computational model from experimental observations of the physical system being modeled. The specifications may be received as time series data or variants of logical formulae such as temporal logics describing natural language observations.

In one aspect, the inventive concepts disclosed herein are directed to a stochastic computational model parameter synthesis system. The system comprises at least one processor capable of executing processor executable code, and a non-transitory computer memory operably coupled with the at least one processor and storing processor executable code, which when executed by the at least one processor, causes the at least one processor to synthesize at least one parameter of a stochastic computational model to satisfy one or more behavioral specifications of properties observed in a modeled system by: (1) receiving a first input signal from a user over a network interface, the first input signal indicative of a parametric stochastic computational model to be carried out by the at least one processor; (2) accessing the at least one parameter to be synthesized; (3) receiving a second input signal indicative of a behavioral specification indicative of a property observed in the modeled system; (4) receiving a minimum probability with which the stochastic model must satisfy the behavioral specification; (5) generating one or more randomized projections of a first parameter space having n dimensions into one or more second abstract parameter space having d dimensions, where d is less than n, wherein a distance between n+1 chosen anchor points in the first parameters space and a point corresponding to the parameter values with the highest probability of satisfying the specification in the one or more second abstract parameter space is preserved; (6) searching the one or more second abstract parameter space by exhaustively searching discretized values in the one or more second abstract parameter space obtained by performing a randomized projection of the first parameter space having n dimensions; and (7) transmitting an output signal to a user, the output signal indicative of at least one synthesized parameter value.

This summary is provided to introduce a selection of concepts in a simplified form that are further described below in the detailed description. This summary is not intended to identify key features or essential features of the claimed subject matter, nor is it intended to be used as an aid in determining the scope of the claimed subject matter.

BRIEF DESCRIPTION OF THE DRAWINGS

To assist those of ordinary skill in the relevant art in making and using the inventive concepts disclosed herein, reference is made to the appended drawings and schematics, which are not intended to be drawn to scale, and in which like reference numerals are intended to refer to the same or similar elements for consistency. For purposes of clarity, not every component may be labeled in every drawing. Certain features and certain views of the figures may be shown exaggerated and not to scale or in schematic in the interest of clarity and conciseness. In the drawings.

DETAILED DESCRIPTION

Before explaining at least one exemplary embodiment of the inventive concepts disclosed and claimed herein in detail, it is to be understood that the inventive concepts disclosed and claimed herein are not limited in their application to the details of construction, experiments, exemplary data, and/or the arrangement of the components set forth in the following description, or illustrated in the drawings. The inventive concepts disclosed and claimed herein are capable of other embodiments, or of being practiced or carried out in various ways.

Also, it is to be understood that the phraseology and terminology employed herein is for purpose of description only and should not be regarded as limiting in any way unless expressly and specifically indicated as such. In the following detailed description and in the accompanying drawings, numerous specific details of various non-limiting embodiments of the presently disclosed and claimed inventive concepts are set forth in order to provide a more thorough understanding of the inventive concepts. However, it will be apparent to one of ordinary skill in the art that the inventive concepts within the disclosure may be practiced without these specific details. In other instances, well-known features have not been described in detail to avoid unnecessarily complicating the present disclosure.

As utilized in accordance with the present disclosure, the following terms, unless otherwise indicated, shall be understood to have the following meanings:

The use of the word "a" or "an" when used in conjunction with the term "comprising" in the claims and/or the specification may mean "one," but it is also consistent with the meaning of "one or more," "at least one," and "one or more than one."

Throughout this application, the terms "approximately," "substantially," and "about" are used to indicate that a value includes the inherent variation of error for the device or composition, the method being employed to measure or determine the value, manufacturing tolerances, stress exerted on components or parts, wear and tear, or combinations thereof.

The use of the terms "at least one" and "one or more" will be understood to include one as well as any quantity more than one, including but not limited to each of, 2, 3, 4, 5, 10, 15, 20, 30, 40, 50, 100, and all integers therebetween. The terms "at least one" and "one or more" may extend up to 100 or 1000 or more, depending on the term to which it is attached; in addition, the quantities of 100/1000 are not to be considered limiting, as higher limits may also produce satisfactory results. Singular terms shall include pluralities and plural terms shall include the singular unless indicated otherwise.

As used in this specification and claims, the terms "comprising" (and any form of comprising, such as "comprise" and "comprises"), "having" (and any form of having, such as "have" and "has"), "including" (and any form of including, such as "includes" and "include") or "containing" (and any form of containing, such as "contains" and "contain") are inclusive or open-ended and do not exclude additional, unrecited elements, features, or method steps.

The terms "or combinations thereof" and "and combinations thereof" as used herein refer to all permutations and combinations of the listed items preceding the term. For example, "A, B, C, or combinations thereof" is intended to include at least one of: A, B, C, AB, AC, BC, or ABC, and if order is important in a particular context, also BA, CA, CB, CBA, BCA, ACB, BAC, or CAB. Continuing with this example, expressly included are combinations that contain repeats of one or more item or term, such as BB, AAA, AAB, BBC, AAABCCCC, CBBAAA, CABABB, and so forth. The skilled artisan will understand that typically there is no limit on the number of items or terms in any combination, unless otherwise apparent from the context.

As used herein, the terms "network-based," "cloud-based" and any variations thereof, are intended to cover the provision of configurable computational resources on demand via interfacing with a computer network, with software and/or data at least partially located on the computer network, by pooling the processing power of two or more networked processors, for example.

Further, unless expressly stated to the contrary, "or" refers to an inclusive or (e.g., and/or) and not to an exclusive or. For example, a condition A or B is satisfied by anyone of the following: A is true (or present) and B is false (or not present), A is false (or not present) and B is true (or present), and both A and B are true (or present).

Finally, as used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

Exemplary embodiments of a computer system configured to operate as a stochastic computational model parameter synthesis system are described herein.

Figure 1:
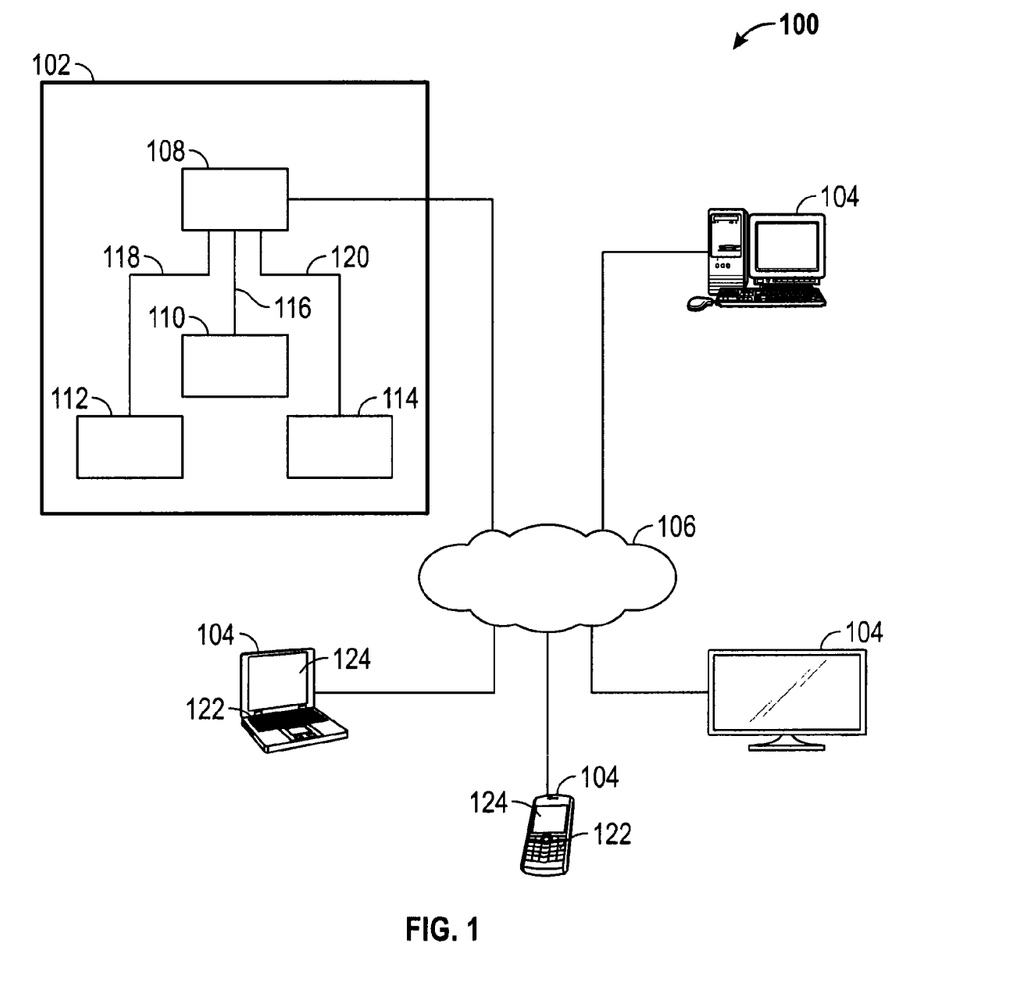
FIG. 1 is a block diagram of an exemplary embodiment of a stochastic computational model parameter synthesis system according to the inventive concepts disclosed herein.

Referring now to FIG. 1, an exemplary embodiment of a stochastic computational model parameter synthesis system 100 according to an exemplary embodiment of the inventive concepts disclosed herein may comprise one or more computer system 102 that may be capable of interfacing and/or communicating with one or more user terminal 104 and with one or more other computer systems 102 over a network 106. The one or more computer system 102 may form a host system, such as a website, and the network 106 may be the Internet.

The computer system 102 may comprise personal computers, mainframe computers, GPGPU (General-Purpose Graphics Processing Units) servers, CPU clusters, clouds, and combinations thereof. In one embodiment, the one or more computer system 102 may have one or more processor 108 capable of executing processor executable code, one or more non-transitory memory 110 capable of storing processor executable code, an input device 112, and an output device 114, all of which can be partially or completely network-based or cloud-based, and not necessarily located in a single physical location.

The one or more processor 108 can be implemented as a single processor 108 or multiple processors 108 working together to execute the logic described herein. Exemplary embodiments of the one or more processor 108 include a digital signal processor (DSP), a central processing unit (CPU), a field programmable gate array (FPGA), a microprocessor, a multi-core processor, and combinations thereof. The one or more processor 108 is capable of communicating with the one or more memory 110 via a path 116 which can be implemented as a data bus, for example. The one or more processor 108 is capable of communicating with the input device 112 and the output device 114 via paths 118 and 120 including one or more data busses. The one or more processor 108 may be further capable of interfacing and/or communicating with the one or more user terminal 104 via the network 106, such as by exchanging electronic, digital and/or optical signals via one or more physical or virtual ports using a network protocol such as TCP/IP, for example. It is to be understood that in certain embodiments using more than one processor 108, the one or more processors 108 may be located remotely from one another, located in the same location, or comprising a unitary multi-core processor 108 (not shown). The one or more processor 108 is capable of reading and/or executing processor executable code and/or or creating, manipulating, altering, and storing computer data structures into the one or more memory 110.

The one or more memory 110 stores a stochastic computational model parameter synthesis system having processor executable code and may be implemented as any conventional non-transitory memory 110, such as random access memory (RAM), a CD-ROM, a hard drive, a solid state drive, a flash drive, a memory card, a DVD-ROM, a floppy disk, an optical drive, and combinations thereof, for example. While the one or more memory 110 can be located in the same physical location as the computer system 102, the one or more memory 110 may be located remotely from the computer system 102 and may communicate with the one or more processor 108 via the network 106. Additionally, when more than one memory 110 is used, one or more memory 110 may be located in the same physical location as the computer system 102, and one or more memory 110 may be located in a remote physical location from the computer system 102. The physical location of the one or more memory 110 can be varied, and the one or more memory 110 may be implemented as a "cloud memory" i.e., one or more memory 110 which is partially, or completely based on or accessed using the network 106.

The input device 112 passes data to the processor 108, and can be implemented as a keyboard, a mouse, a touch-screen, a camera, a cellular phone, a tablet, a smart phone, a PDA, a microphone, a network adapter, and combinations thereof, for example. The input device 112 may be located in the same physical location as the computer system 102, or may be remotely located and/or partially or completely network-based.

The output device 114 passes information from the processor 108 to a user, such that the information can be perceived by the user. For example, the output device 114 can be implemented as a server, a computer monitor, a cell phone, a tablet, a speaker, a website, a PDA, a fax, a printer, a projector, a laptop monitor, and combinations thereof. The term "passes" as used herein may refer to either push technology, pull technology and combinations thereof. The output device 114 can be physically co-located with the computer system 102, or can be located remotely from the computer system 102, and may be partially or completely network based (e.g., a website). The output device 114 communicates with the processor 108. As used herein the term "user" is not limited to a human, and may comprise a human, a computer, a host system, a smart phone, a tablet, and combinations thereof, for example.

The network 106 preferably permits bi-directional communication of information and/or data between the computer system 102 and/or one or more user terminal 104. The network 106 may interface with the computer system 102 and the user terminal 104 in a variety of ways, such as by optical and/or electronic interfaces, and may use a plurality of network topographies and protocols, such as Ethernet, TCP/IP, circuit switched paths, and combinations thereof, for example. For example, the network 106 can be implemented as the World Wide Web (or Internet), a local area network (LAN), a wide area network (WAN), a metropolitan network, a wireless network, a cellular network, a GSM-network, a CDMA network, a 3G network, a 4G network, a satellite network, a radio network, an optical network, a cable network, a public switched telephone network, an Ethernet network, and combinations thereof, and may use a variety of network protocols to permit bi-directional interface and communication of data and/or information between the computer system 102 and the one or more user terminal 104.

The one or more user terminal 104 can be implemented as a personal computer, a smart phone, network-capable TV set, TV set-top box, a tablet, an e-book reader, a laptop computer, a desktop computer, a network-capable handheld device, a video game console, a server, a digital video recorder, a DVD-player, a Blu-Ray player, and combinations thereof, for example. In an exemplary embodiment, the user terminal 104 comprises an input device 122, an output device 124, one or more processor (not shown) capable of interfacing with the network 106, processor executable code (not shown), and a web browser capable of accessing a website and/or communicating information and/or data over a network, such as the network 106. As will be understood by persons of ordinary skill in the art, the one or more user terminal 104 may comprise one or more non-transient memories comprising processor executable code and/or software applications, for example.

The one or more memory 110 preferably stores processor executable code and/or information comprising the stochastic computational model parameter synthesis algorithm. The processor executable code may be written in any suitable programming language, such as C++. The stochastic computational model parameter synthesis algorithm may be implemented as software, firmware, or a combination of software and firmware.

The computer system 102 may access and execute processor executable code to carry out a stochastic computational model parameter synthesis as described herein. The computer system 102 computes the parameter values that allow the model to satisfy the behavioral specification observed in a physical or non-physical system being modeled. If such a parameter cannot be found, the computer system 102 generates an implicit probabilistic proof that the computational model cannot satisfy the observations obtained from the system being modeled, and provides such proof to the user. As will be appreciated by a person of ordinary skill in the art, in some exemplary embodiments two or more computer systems 102, or two or more processors 108 may operate in parallel to execute a stochastic computational model parameter synthesis system 100 according to the inventive concepts disclosed herein.

In various embodiments, the stochastic computational model parameter synthesis algorithm used by the stochastic computational model parameter synthesis system 100 can synthesize model parameters by (1) receiving stochastic models of a system, behavioral specifications of the system being modeled, and the space of model parameters; (2) generating parallelized randomized projections of the parameter space that probabilistically preserve the optimal value of the model parameter; (3) exhaustively exploring the low dimensional randomized projection of the parameter space; (4) mapping the low dimensional abstract parameters to the high dimensional parameter space; and (5) exploring the model with obtained high dimensional parameter values to determine the probability with which the computational model satisfies the behavioral specification learnt from the system being modeled. In some embodiments, the stochastic computational model parameter synthesis system 100 can also prove the absence of any parameter values that enable the stochastic model to satisfy the behavior observed in the system being modeled. The stochastic computational model parameter synthesis algorithm used by the stochastic computational model parameter synthesis system 100 ensures that the synthesized parameters enable the computational stochastic model to satisfy the behavioral specification observed in the system being modeled.

In some embodiments of the stochastic computational model parameter synthesis system 100, stochastic models may occur in various embodiments: (1) Discrete Time Markov Chains are finite state models with a fixed number of states and discrete probabilistic transitions between these states. Each transition is labeled with a number between 0 and 1 that denotes the probability of the system evolving from one state to another. (2) Continuous Time Markov chains are also finite state models with a fixed number of states but the transitions between the states can happen at any moment in a continuous time. Each transition is labeled with a rate of transition that denotes the rate at which the system evolves from one state to another. (3) Stochastic Differential Equation models are continuous state and continuous time models. The evolution of an SDE model includes two components—(i) a deterministic differential term that captures the rate at which the system evolves with time, and (ii) a stochastic term that captures the effect of random noise on the behavior of the system.

The stochastic computational model parameter synthesis system 100 makes a well-motivated assumption about the influence of parameters on the behavior of a stochastic computational model. The stochastic computational model parameter synthesis system 100 requires that small changes to the values of the parameters only cause bounded changes to the probability with which the model satisfies a given behavior specification. Such continuous behavior is expected from well-designed computational models that represent physical or non-physical systems. The fundamental reason behind such robustness in behavior lies in the fact that physical and non-physical systems usually do not show dramatic changes in behavior when they are only slightly perturbed. In the context of a stochastic model that has n parameters $p_1, p_2, \ldots p_n$, a slightly perturbed stochastic model is the model with modified parameters $p_1', p_2', \ldots, p_n'$. Here, $p_1(1-e) \leq p_1' \leq p_1(1+e)$ $p_2(1-e) \leq p_2' \leq p_2(1+e) \ldots p_n(1-e) \leq p_n' \leq pn (1+e)$, where e<1. In some embodiments, a method according to the inventive concepts disclosed herein requires the user to quantify the relationship between the values of the parameters and upper bound on the change in the probability of the model satisfying a given behavioral specification.

One goal of a stochastic computational model parameter synthesis system 100 implemented according to the inventive concepts disclosed herein is to synthesize (e.g., generate or find out) approximations of optimal parameter values i.e., those values of the model parameters that enable the model to satisfy a given behavioral specification with a given or higher probability. In order to achieve this objective, the stochastic computational model parameter synthesis system 100 constructs suitably chosen randomized metric embeddings of the original parameter space into a lower dimensional abstract parameter space. The design of the metric embeddings preserves the distance (e.g., as an Euclidean distance metric) between the optimal model parameter values and a priori chosen anchor points in the parameter space. For example, the distance between the set of parameter values $p_1, p_2, p_n$ and another set of parameter values $q_1, q_2, \ldots, q_n$ is given by $((p_1-q_1)^2+(p_2-q_2)^2+ \ldots +(p_n-q_n)^2)^{(1/2)}$.

In various embodiments, the stochastic computational model parameter synthesis system 100 does not need to know the optimal parameter values that enable the model to satisfy the specification with the given probability in order to construct such a randomized metric embedding. Specification of a model is a formal description of the behavior expected from the system, for example. For a stochastic system, a specification is a formal description of the behavior expected from the system and the probability with which the system satisfies the behavior as will be understood by a person of ordinary skill in the art having the benefit of the instant disclosure. One particular example of a specification is Probabilistic Boolean Linear Temporal Logic (PBLTL).

A stochastic computational model parameter synthesis system 100 according to the inventive concepts disclosed herein compresses the high dimensional parameter space (e.g., for a model having as many as n parameters, the high dimensional parameter space is n-dimensional. Here, n can be large, such as 100, 200, 1000 etc.) of a stochastic computational model before performing an exhaustive search (e.g., sampling every point in the discretized parameter space such that no two sampled points are less than $\delta(\delta>0)$ distance from each other and at least one point in every $\delta$-radius sphere is sampled) of this low dimensional abstract parameter space. For example, some stochastic computational models may have n parameters, where n may be large. The algorithm "compresses" the parameter space into a lower dimensional parameter space with d parameters, where d<n. The compressed parameter space (e.g., a low-dimensional parameter space d where n is the original n-dimensional parameter space and d<n) probabilistically preserves the point corresponding to the set of parameter values that enable the model to satisfy the given behavioral specification with a given or higher probability. The stochastic computational model parameter synthesis system 100 constructs several randomized embeddings of the high dimensional parameter space into lower dimensional compressed parameter spaces. An exhaustive analysis of a set of discrete points in the lower dimensional abstract parameter space is used to synthesize the set of parameter values that enable the model to satisfy the specification with at least a given threshold probability. An embedding is a mapping from a high dimensional to a low dimensional parameter space. A randomized embedding is such a mapping when it is obtained using a randomized algorithm. For example, it can be given by the low distortion-randomizing matrix as will be described below. In some exemplary embodiments, an algorithm is adaptive and decides the number of embeddings that must be made based on a condition and an assignment as will be described with reference to FIG. 4 below. An algorithm according to the inventive concepts disclosed herein may build only one embedding, or may make any finite number of embeddings before the algorithm terminates, for example.

Figure 2:
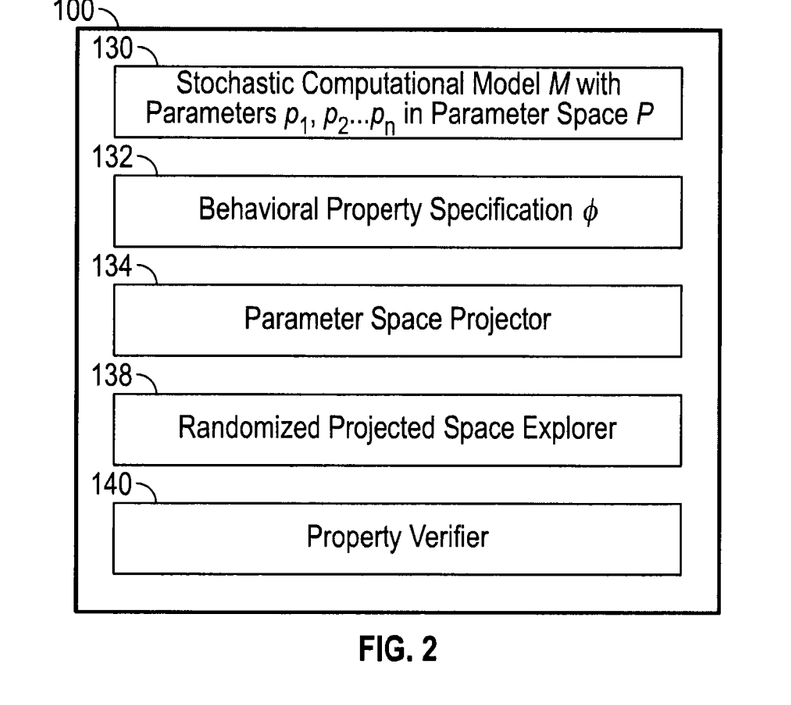
FIG. 2 is a block diagram illustrating components of a stochastic computational model parameter synthesis system according to the inventive concepts disclosed herein.
Figure 3:
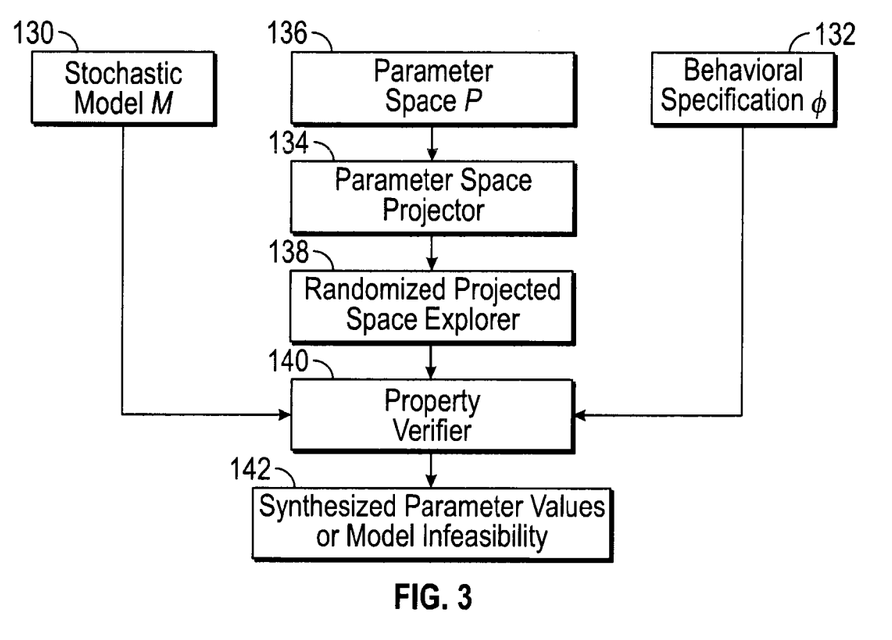
FIG. 3 is a flow diagram illustrating the logic flow of a stochastic computational model parameter synthesis system in some exemplary embodiments of the inventive concepts disclosed herein.

Referring now to FIGS. 2-3, in some exemplary embodiments, the computational stochastic model parameter synthesis system 100 may include five components.

A first component 130 can be a stochastic computational model M with n parameters $p_1, p_2, \ldots p_n$ in parameter space P. In various embodiments, the model may be a continuous time Markov chain, a discrete time Markov chain, stochastic differential equation, or a jump diffusion process, for example.

A second component 132 can be a property specification $\phi$ that describes the behavior of the system being modeled. The property specification may be an adapted finitely monitorable (AFM) specification i.e., one should be able to decide whether the specification holds on the model or not by observing only finite executions of the system. "Synthesis and infeasibility analysis for stochastic models of biochemical systems using statistical model checking and abstraction refinement" (Sumit Kumar Jha and Christopher James Langmead) describes adapted finitely monitorable (AFM) specifications, and is incorporated herein by reference.

A third component 134 can be a parameter space projector that embeds the high dimensional parameter space 136 (FIG. 3) of the computational model into a smaller dimensional parameter space.

A fourth component 138 can be a randomized projected space explorer that can sample discretized parameter values in the randomized lower dimensional parameter space, and evaluate the stochastic computational model with the corresponding parameter values in the high dimensional parameter space.

A fifth component 140 can be a property verifier that tests whether a given parameterization of the stochastic computational model satisfies the given behavior with at least a given probability. Property verifiers are described in Jha, S. K. and Langmead, C. J. (2011) that explores behaviors of sde models of biological systems using change of measures In Mandoiu, I. I, Miyano, S., Przytycka, T. M., and Rajasekaran, S., editors, *ICCABS* pages 111-116. IEEE Computer Society and Jha, S. K., Langmead, C. J., Mohalik, S., and Ramesh, S. (2011) When to stop verification?: Statistical trade-off between expected loss and simulation cost In DATE pages 1309-1314. IEEE, and are incorporated herein by reference. A result 142 (FIG. 3) includes the synthesized parameter values or indicated model infeasibility.

It is to be understood that while five components are described above, a computational stochastic model parameter synthesis system 100 according to exemplary embodiments of the inventive concepts disclosed herein may have additional components. For example, the stochastic computational model may include a simulation algorithm or the model and the simulation algorithm may be available as a single piece of computer code, or combinations thereof.

Figure 4:
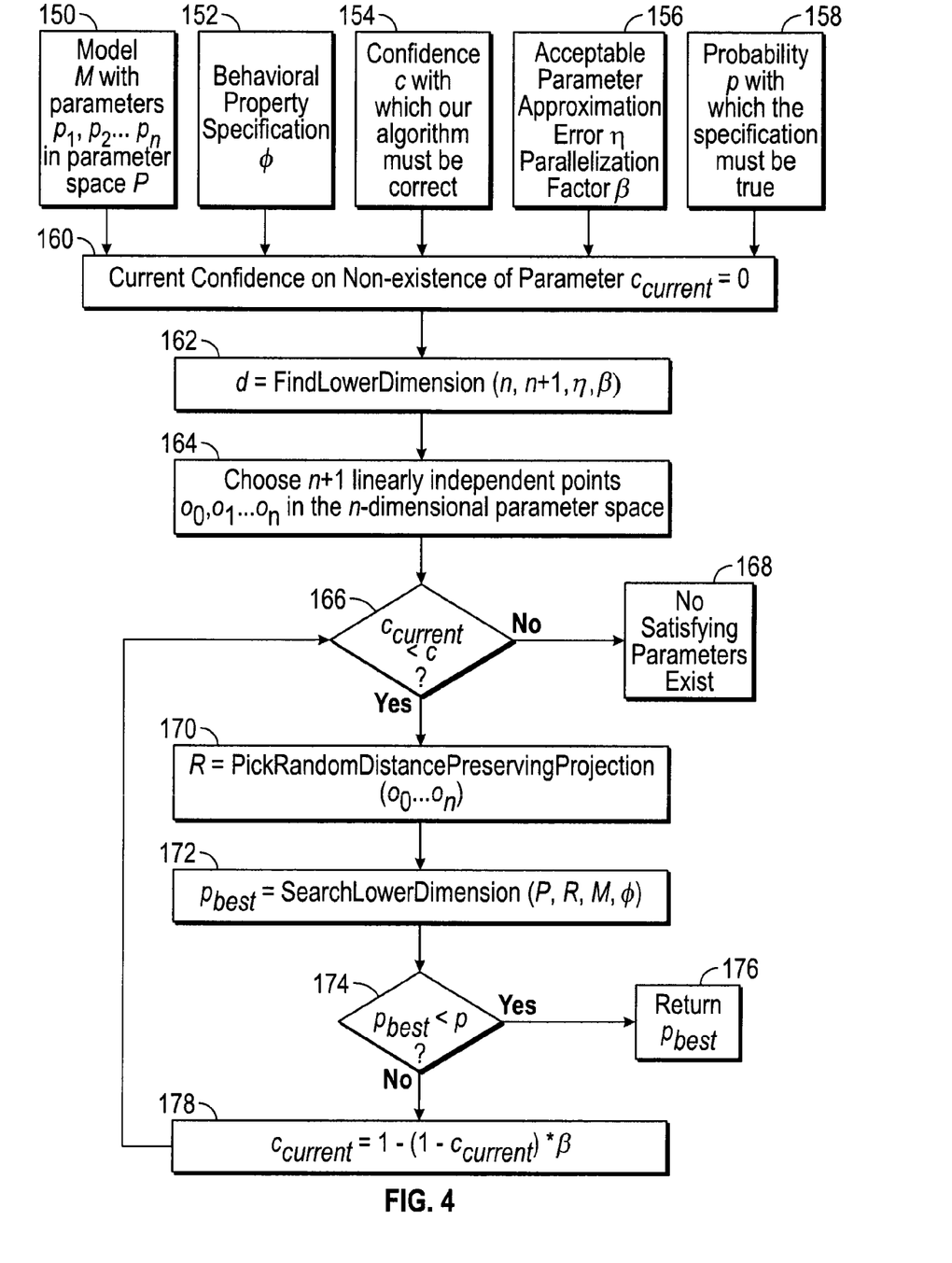
FIG. 4 is a flow diagram illustrating a parameter space projector routine invoked by a stochastic computational model parameter synthesis system in some exemplary embodiments of the inventive concepts disclosed herein.

Referring now to FIG. 4, in one embodiment, the stochastic computational model parameter synthesis system 100 accepts five inputs, e.g., a first input 150, a second input 152, a third input 154, a fourth input 156, and a fifth input 158.

Input 150 can be a stochastic model M with n parameters $p_1, p_2, \ldots, p_n$ in the high dimensional parameter space P. The model may be a continuous time Markov chain, a discrete time Markov chain, a stochastic differential equation, or a jump diffusion process, for example.

Input 152 can be a property specification $\phi$ that describes the behavior of the system being modeled. The property specification may be an adapted finitely monitorable (AFM) specification i.e., one should be able to decide whether the specification holds on the model or not by observing only finite simulations of the computational model.

Input 154 can be a confidence c with which the stochastic computational model parameter synthesis system 100 must declare that no parameter values could be obtained for the computational model. When the stochastic computational model parameter synthesis system 100 stops and states that no suitable parameter values to be found, it will ensure that such an answer is correct with the probability of confidence c. As will be appreciated by persons of ordinary skill in the are having the benefit of the instant disclosure, it is desirable that the stochastic computational model parameter synthesis system 100 is able to identify a scenario where it is impossible for a stochastic model to satisfy a specification for any choice of parameter values. However; it is to be understood that not every implementation of the stochastic computational model parameter synthesis system 100 would necessarily be able to identify such inconsistent parameterized stochastic models and specifications. The value of c can be chosen by the user before the parameter synthesis system starts and may be less than 1. If the stochastic computational model parameter synthesis system 100 produces a set of parameter values that enable the model to satisfy the given specification with at least probability p, then the answer of the stochastic computational model parameter synthesis system 100 is correct with probability one.

Input 156 includes acceptable parameters approximation error η and parallelization factor β.

Input 158 is a minimum probability p with which the specification $\phi$ must be true on the model M.

In a first step 160, the stochastic computational model parameter synthesis system 100 initializes the current confidence $c_{conf}$ in the non-existence of a set of parameter values that enables the model M to satisfy the specification $\phi$ with probability at least p. As the stochastic computational model parameter synthesis system 100 has no information to support the nonexistence of such a set of parameter values, it initializes the current confidence as 0.

In a second step 162, the stochastic computational model parameter synthesis system 100 computes the lower dimension in which it seeks to embed the high dimensional parameter space. The stochastic computational model parameter synthesis system 100 will search this lower parameter space exhaustively. In this embodiment, this computation step takes three inputs: (i) the number of parameters n in the stochastic computational model. (ii) the acceptable parameter approximation error η, and (iii) the parallelization factor β. The lower dimension is given by the smallest integer larger than $$\frac{4+2\beta}{\frac{\eta^2}{2}-\frac{\eta^2}{3}}\log(n+1).$$

Table 1 indicates the higher dimensions and one set of possible lower dimensions for various embodiments of the stochastic computational model parameter synthesis system 100.

TABLE 1

| Number of Parameters (n) | Parameter Approximation Error (η) | Parallelization Factor (β) | Lower Dimension |
|---|---|---|---|
| 1000 | 0.5 | 1 | 498 |
| 1000 | 0.75 | 1 | 295 |
| 10000 | 0.5 | 1 | 664 |
| 10000 | 0.75 | 1 | 393 |

In a third step 164, the stochastic computational model parameter synthesis system 100 chooses n+1 linearly independent points as n+1 anchor points in n-dimensional space. The independence of these points ensures that measuring distances from each of these anchor points uniquely identifies every point in the n-dimensional parameter space. This is important because, in one embodiment, the stochastic computational model parameter synthesis system 100 needs to map parameter values in the compressed low dimensional parameter space to the high dimensional parameter space. By approximately preserving distances from these n+1 anchor points, the stochastic computational model parameter synthesis system 100 is able to search lower dimensional parameter spaces, and still find the parameter values that enable the model to satisfy the specification with at least the given probability.

In a decision step 166, the stochastic computational model parameter synthesis system 100 verifies whether the current confidence $C_{current}$ of the system in the absence of parameter values that enable the model to satisfy the specification exceeds the given confidence threshold c. If this is indeed the case, the stochastic computational model parameter synthesis system 100 stops and informs the user that the model does not satisfy the specification with at least the given probability for any choice of parameter values in a step 168. Further, the design of one embodiment of a stochastic computational model parameter synthesis system 100 ensures that this statement is true with probability at least c. If this is not the case, the stochastic computational model parameter synthesis system 100 continues to a fifth step 170.

In the fifth step 170, the stochastic computational model parameter synthesis system 100 computes the randomized distance preserving projection from n dimensions to d dimensions. Random projections are described by Dimitris Achlioptas, "Database-friendly random projections: Johnson-Lindenstrauss with binary coins," Journal of Computer and System Sciences 66 (2003) 671-687, which is incorporated herein by reference. In order to construct such randomized distance preserving projections, in one embodiment, the stochastic computational model parameter synthesis system 100 constructs low distortion randomizing matrices. For example, let X be the set of (n+1) anchor points chosen earlier and the parameter point with the highest probability value in the n-dimensional space represented as an |X| times n matrix A. Given constants η, β>0, and $$d \geq \frac{4+2\beta}{\frac{\eta^2}{2} - \frac{\eta^2}{3}} \log|X|,$$

then the n times d matrix $A=A_{ij}$ is said to be a low distortion randomizing matrix for X if and only if $$A_{ij} = \sqrt{\frac{3}{n}} \quad (1)$$

with probability ⅙, $$A_{ij} = -\sqrt{\frac{3}{n}} \quad (2)$$

with probability ⅙, and (3) $A_{ij}=0$ with probability ⅔. Given a low dimensional randomizing matrix A, the function F mapping the $i^{th}$ row of X to the $i^{th}$ row of AX satisfies the following constraint with probability at least $1-|X|^{-\beta}$, for all u, v ∈X: $(1-\eta)\|u-v\|^2 \leq \|f(u)-f(v)\|2 \geq (1+\eta)\|u-v\|^2$. Intuitively, the lemma states that a set of suitably chosen random projections probabilistically preserve the pairwise distance between a cloud of points.

In a sixth step 172, in one embodiment, the stochastic computational model parameter synthesis system 100 calls the Randomized Parameter Space Explorer procedure and passes it five arguments: (i) the high dimensional parameter space P the randomized distance preserving projection R (iii) the stochastic model M, (iv) the specification φ, and (v) the acceptable discretization δ. The Randomized Parameter Space Explorer procedure returns the maximum probability with which the stochastic model satisfies the specification during the exploration of the low dimensional parameter space.

In a decision step 174, the stochastic computational model parameter synthesis system 100 verifies if the maximum probability $p_{best}$ with which the model satisfied the specification in the sixth step 172 exceeds the given probability threshold p. If this is indeed the case, the stochastic computational model parameter synthesis system 100 stops and reports the probability with which the stochastic model satisfies the specification in a step 176. Otherwise, the stochastic computational model parameter synthesis system 100 updates the current confidence in the non-existence of parameter values that enable the model to satisfy the specification with probability at least p in a step 178, and goes back to step 166.

Figure 5:
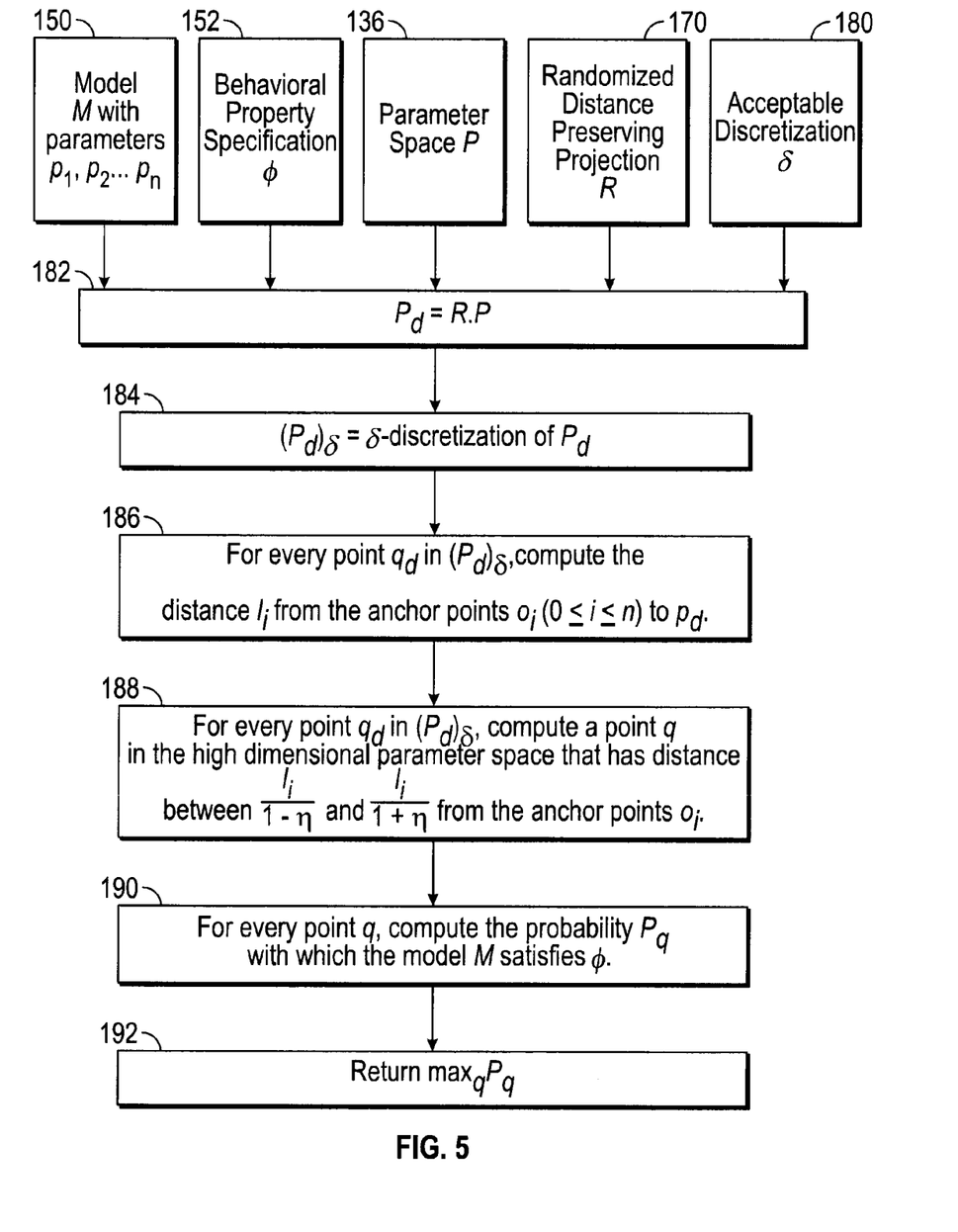
FIG. 5 is a flow diagram illustrating a randomized projected space explorer routine invoked by a stochastic computational model parameter synthesis system in some exemplary embodiments of the inventive concepts disclosed herein.

Referring now to FIG. 5, the routine or procedure of the Randomized parameter space explorer component 138 (FIG. 3) is shown. In this embodiment, the procedure takes five inputs: the stochastic model M (input 150, FIG. 4), the property specification φ (input 152, FIG. 4), the parameter space P (input 136, FIG. 3), the randomized projection R (from step 170, FIG. 4), and an acceptable discretization in the lower dimension space δ (input 180). The routine then computes the lower dimension parameter space $P_d$=PR in a step 182.

In a next step 184, the procedure discretizes the lower dimension parameter space by sampling parameter values at intervals of δ.

In a third step 186, the procedure computes the distance for each of the sampled points from the anchor points.

In a fourth step 188, the algorithm uses the distance between the sampled point and the anchor points to determine a corresponding sample point in the high dimension parameter space.

In a step 190, the algorithm uses a property verifier to compute the probability with which the model satisfies the given specification for this particular choice of parameter values.

The Randomized Parameter Space Explorer component 138 then identifies and returns the parameter values that enable the model to satisfy the behavioral specification with the highest probability in a step 192.

In an exemplary embodiment, a stochastic computational model parameter synthesis system 100 can be used for synthesizing parameters of a stochastic computer model of a physical system, such as a cyber-physical systems and a biological modeling system.

A fundamental problem in computational systems biology is the synthesis of kinetic parameters from experimental data and expert insight. For example, a relatively simple abstract agent-based model of sepsis may involve as many as 2000 kinetic parameters. The model itself may consist of a number of different types of agents modeled in a two-dimensional or three-dimensional spatial grid. Further, different discretizations of time may be used to speed up the execution of the model. The parameters may represent different physical components: one set of parameters may describe the concentration of various biochemical agents in the blood such as pro-inflammatory cytokines interleukin IL-1, IL-6, and tumor necrosis factor (TNF)-α; another set of parameters may describe the time and dosage of various interferences such as drugs; a separate set of parameters may describe biochemical reaction rate parameters such as the rate at which cytokines are being generated.

While the parameters of the stochastic computational models are known, their values are difficult to obtain using a purely experimental approach. For example, a system with n=200 parameters p and only 10 different values for every parameter yields more than $10^{200}$ different values of the parameters p. The computational modeling expert would like to determine one or more parameter p values such that the model can reproduce the experimental observations and expert insight known about sepsis. While the structure of the computational stochastic models of biochemical systems can be obtained from first principles, the numerical values of the kinetic parameters cannot be obtained from experimental observations. Instead, indirect experimental observations are used to determine the kinetic parameter values indirectly.

Experimental data and expert insight can be encoded as behavioral specifications φ in a formal logical specification framework such as Bounded Linear Temporal Logic. For example, it may be known that the introduction of a certain pathogen will produce inflammatory response within 24 hours. The expert knowledge can be encoded in temporal logic using the logical formula "Always ((Pathogen>1%)→Future$^{<24\ hours}$ (Inflammation>90%))". The formula states that it is always the case that if the pathogen exposure exceeds 1%, the inflammation response reaches 90% of its maximum value. The ability to express both time-series data and more subtle expert knowledge in this unambiguous formal logic framework may be important as it allows the automated verification of parameter values using statistical model checking methods without human or expert guidance. Further, one or more parameter values can be explored in parallel by modern petascale and exascale ($10^{18}$) systems, while the number of possible experts available for such a verification is bounded by the human population ($10^{10}$). The ability to verify a parameter value against a set of observations encoded in a formal logic may be important to parameter synthesis systems according to the inventive concepts disclosed herein.

The stochastic computational model parameter synthesis system 100 may then pick up 201 (or n+1) linearly independent anchor points in the 200-dimensional (or n-dimensional) parameter space as described above with reference to FIG. 4. These 201 anchor points denote values in the parameter space of the stochastic agent based model of sepsis. As will be appreciated by persons of ordinary skill in the art, the stochastic computational model parameter synthesis system 100 may choose more than 201 anchor points in some exemplary embodiments; however, the system 100 may not choose fewer than 200 anchor points in any embodiment of the stochastic computational model parameter synthesis system 100. In one exemplary embodiment, the anchor points may be chosen as (0, 0, . . . , 0), (1, 0, 0, . . . , 0), (0, 1, 0, . . . , 0), (0, 0, 1, 0, . . . , 0), (0, 0, 0, . . . 1, 0), (0, 0, 0, . . . , 0, 1). The stochastic computational model parameter synthesis system 100 then embeds the 200 dimensional parameter space of the stochastic agent-based model of sepsis into a lower dimensional parameter space, such that the distance between these anchor points and the best parameter value is preserved as described above. In order to do so, the stochastic computational model parameter synthesis system 100 generates randomized embedding matrices as discussed above in connection with FIG. 4 and step 170. It is to be understood that the lower dimensional parameter space does not represent the parameters of the original stochastic agent based model; instead, the lower dimensional parameter space represents a linear combinations of the 200 original parameters in the original agent-based model of sepsis.

Using the approximation error η provided as an input to the stochastic computational model parameter synthesis system 100, one embodiment of the system 100 may choose a randomized embedding matrix M with 202 rows and 20 columns. A higher choice of the approximation error η permits the parameter synthesis system to further reduce the dimension of the parameter space, while a small value of the approximation error η ensures that the generated parameter value is close to the optimal parameter value. In one embodiment, the approximation error n inputted to the stochastic computational model parameter synthesis system 100 may be chosen as being about 0.5, for example, although any other values may be specified. The value of the approximation error η may depend on the robustness of the stochastic agent-based model; if small changes in parameter values are bound to show small changes in the probability of the model satisfying the formal specification, a larger value of the approximation error η may be sufficient. In the case of the agent-based model for sepsis and many other biochemical systems, the model may be continuous e.g., small changes in parameter values produce small changes in the behavior of the system.

Each such randomizing matrix M may preserve the pairwise distance among the anchor points and the best parameter value with a non-zero probability determined by the parallelization factor β that is an input to the stochastic computational model parameter synthesis system 100. For example, the parallelization factor β may have values ranging from about 0 to about 1. If the parallelization factor β is high, the probability of each individual randomized matrix embedding preserving the pairwise projections between the anchor points and the best parameter value is small; thus, a larger number of such randomized embedding matrices would have to be constructed so as to amplify the overall probability of exploring the 200 parameter space to within the input specified by the probability of confidence c.

For each randomized embedding matrix M that is constructed using step 170 as described above, a linear mapping from the 200 dimensional parameter space of the agent-based model and the lower 20 dimensional parameter space may be established. Using the method described above with reference to FIGS. 4-5, the stochastic computational model parameter synthesis system 100 performs a substantially complete exploration of the lower 20 dimensional parameter space obtained by the linear combination of the 200 parameters in the higher dimensional space. If the system has to explore 10 parameters for every dimension in the lower dimensional parameter space, it needs to explore only $10^{20}$ as opposed to $10^{200}$ points. While $10^{200}$ computations are difficult to perform using current technology, $10^{20}$ computations is within the capacity of an exascale ($10^{18}$) computing system, such as the computer system 102, for example.

As the lower dimensional parameter space of the agent based stochastic model for sepsis is being explored, the lower dimensional parameter value may not be directly used to perform simulations of the original model. While the model may have 200 parameters, the lower dimensional parameter space (formed by a linear combination of points in the higher dimensional parameter space) only has 20 parameters. Thus, the lower dimensional parameter space may be mapped back to the higher dimensional parameter space. For each 20-dimensional point in the lower dimensional parameter space, the parameter synthesis system 100 uses the distance among the anchor points to compute the 200-dimensional parameter values in the higher dimensional parameter space that corresponds to this point. Then, this 200-dimensional parameter may be used to simulate the agent-based model.

Using the steps described with reference to FIG. 5 above, the stochastic computational model parameter synthesis system 100 decides if this parameter value satisfies the formal specification with the probability specified in the input to the stochastic computational model parameter synthesis system 100. If a parameter value is found that satisfies the specification with the input probability or more, the stochastic computational model parameter synthesis system 100 stops. Otherwise, the system 100 may continue to construct randomized embedding matrices either sequentially or in a parallel manner on multiple processors, for example.

As additional lower dimensional parameter spaces are explored, the stochastic computational model parameter synthesis system 100 may compute the probability of the projections finding a parameter value (if one exists) that satisfies the input formal specification using the step 178 as described above. If this probability exceeds the input probability of confidence c with which the stochastic computational model parameter synthesis system 100 must find the correct answer, then the stochastic computational model parameter synthesis system 100 stops and reports that the given stochastic model for sepsis cannot satisfy the given formal specification with the input probability.

Thus, the parameterized computational stochastic model parameter synthesis system 100 described herein can be used to synthesize kinetic parameters of biochemical models in computational systems biology.

In an exemplary embodiment, a stochastic computational model parameter synthesis system 100 can be used for synthesizing parameters of a stochastic computer model of a non-physical system, such as a financial trading system.

A challenging problem in discovering quantitative trading strategies is the discovery of model parameters that provide a good fit to historical data, produce profitable trading strategies, and also satisfy zero or more trading regulations (such as bounds on the risk of such a trade). A trading strategy may involve zero or more predictive financial models of the underlying assets, and one or more trading rules that govern the buy or sell decisions for one or more assets. Each predictive financial model and trading strategy model may involve one or more parameters. While an expert can guide the choice of the predictive financial model or the trading strategy model, it is difficult to manually obtain the numerical values of the parameters involved in the models. One possible choice of such a model is the synthesis of portfolios where each asset makes an equal contribution to the overall risk of the entire portfolio. Consider a portfolio $P=a_1 S_1 + a_2 S_2 + a_n S_n$, where $S_i$ represents an asset (such as an equity or a future) of type i, and $a_i$ indicates the number of units of the asset held in the portfolio. Further, each asset $S_i$ poses a risk of loss $R_i$ to the entire portfolio: the risk is a function of both the asset $S_i$ itself and the (possibly nonlinear) correlation between this asset $S_i$ and other assets in the portfolio, e.g., $R_i = ci\ ai^{ri} + ai(c1i\ a1^{r1i} + c2i\ a2^{r2i} + \cdots + cni\ an^{rni}) + Wi(1)$. Here, the numbers ci, c1i, c2i, ..., cni, ri, r1i, r2i, ..., rni, can be obtained directly from the observed data and Wi denotes the standard Brownian motion at unit time—a random noise term. A fundamental problem in creating risk-averse portfolios is to ensure that the risk posed by every asset in the portfolio is approximately the same i.e. $R_1 \approx R_2 \approx \ldots \approx R_n$ with high probability of about 99%, for example. Thus, the financial engineer may synthesize the value of the parameters $a_1, a_2, \ldots, a_n$, so that she can determine the number of assets of each type that she should include in the portfolio. The goal of the financial engineer is to ensure that the risk contribution of every asset $R_i$ is approximately the same, e.g., $0.9\ R < R_i < 1.1\ R$. Because of the nonlinear relationship between the assets, a closed-form algebraic solution has not been obtained.

In one exemplary embodiment, for a portfolio with 100 stocks, 100 different parameters denoting, for example, the number of assets of each asset type held in the portfolio may be synthesized by a stochastic computational model parameter synthesis system 100 according to the inventive concepts disclosed herein. Assuming that each parameter value may take 10 different values, a total of $10^{100}$ different possibilities may be explored. Instead, the stochastic computational model parameter synthesis system 100 may choose 101 anchor points and may construct randomizing matrices that preserve the pairwise distance among the anchor points and the point in the parameter space with the minimum difference among the risk contributions of different assets. A randomizing matrix M may have 102 rows and 15 columns, for example. Thus, the stochastic computational model parameter synthesis system 100 seeks to embed the higher 100-dimensional space into the lower 15-dimensional parameter space. Each such embedding will preserve the pairwise distance between the anchor points and the parameter values of interest with non-zero probability. For each 15-dimensional projected space generated by the stochastic computational model parameter synthesis system 100, the system 100 may substantially completely explore all the points in this lower dimensional parameter space. Each 15-dimensional parameter point can be mapped back to the 100-dimensional parameter by using the fact that pairwise distances between the anchor points and the parameter values that enable every asset to make equal risk contribution to the portfolio. These 100-dimensional parameter values can be used to verify if the portfolio is a risk parity portfolio under the nonlinear stochastic risk model with at least 99% probability. If such a parameter value is obtained, the parameter synthesis system 100 may stop and report the risk parity portfolio. Otherwise, the system 100 may continue to build additional metric embeddings either in a sequential or in parallel manner.

Using the computational stochastic model parameter synthesis system 100 disclosed herein, the number of assets in the portfolio can be chosen so as to ensure that the risk of each asset in the portfolio is almost the same. Such a risk parity portfolio is a very desirable investment as it ensures that a loss in a single asset minimizes cross-contamination to other assets in the portfolio.

In some exemplary embodiments of the inventive concepts disclosed herein, a stochastic computational model parameter synthesis system 100 may be implemented in the design of cyber-physical systems such as artificial pancreata, which involves the synthesis of a number of model parameters that enable the cyber-physical system to satisfy one or more engineering objectives with high probability. A model-predictive control of a moderately sized cyber-physical system may require the synthesis of hundreds of parameters under the influence of stochastic noise. Several engineering design problems, such as material genomics or the in silico prediction of materials from their constituent elements requires the ability to synthesize parameters of high dimensional quantitative and stochastic computational models. The values of these parameters reflect the composition of the alloy that must be synthesized in order to achieve the desired properties of the material.

Another area of increasing importance is the study of process variation on the properties of fabricated integrated circuits. As the sizes of the transistors continue to shrink, small process variations may cause substantial change in the behavior of an integrated circuit. Parameters such as the size of individual transistors may be synthesized by a stochastic computational model parameter synthesis system 100 according to the inventive concepts disclosed herein, so that the performance of the integrated circuits remains robust to small process variations in the fabrication process.

Although the presently disclosed and claimed inventive concepts and the advantages thereof have been described in detail, it should be understood that various changes, substitutions and alterations can be made herein without departing from the spirit and scope thereof as defined by the appended claims. Moreover, the scope of the instant disclosure is not intended to be limited to the particular embodiments of the process, apparatus, items of manufacture, compositions of matter, means, methods, and steps described in the specification. As one of ordinary skill in the art will readily appreciate from the disclosure of the inventive concepts disclosed and claimed herein, various processes, apparatus, items of manufacture, compositions of matter, means, methods, or steps, presently existing or later to be developed that perform substantially the same function or achieve substantially the same result as the corresponding embodiments described herein may be utilized according to the presently disclosed and claimed inventive concepts. Accordingly, the appended claims are intended to include within their scope such processes, apparatus, items of manufacture, compositions of matter, means, methods, or steps.

What is claimed is:

1. A stochastic computational model parameter synthesis system comprising at least one processor capable of executing processor executable code, and a non-transitory computer memory operably coupled with the at least one processor and storing processor executable code, which when executed by the at least one processor, causes the at least one processor to create at least one synthesized parameter value of a stochastic computational model to satisfy one or more behavioral specifications of properties observed in a modeled system by:

receiving a first input signal from a user over a network interface, the first input signal indicative of the stochastic computational model to be carried out by the at least one processor, the stochastic computational model having n parameters in a first parameter space, the first parameter space being n-dimensional;

receiving a second input signal indicative of at least one behavioral specification corresponding to at least one property observed in the modeled system;

receiving a third input signal from the user over a network interface, the third input signal indicating a minimum probability with which the stochastic computational model must satisfy the at least one behavioral specification;

generating one or more second parameter space having d parameters from the first parameter space having n parameters where d is less than n, the one or more second parameter space being d-dimensional;

generating one or more randomized projections of the first parameter space into the one or more second parameter space, the randomized projections probabilistically associated with n+1 linearly independent anchor points in the first parameter space;

searching the one or more second parameter space by exhaustively searching discretized points corresponding to at least one parameter value in the one or more second parameter space to identify the discretized point with a highest probability of satisfying the at least one behavioral specification;

wherein the one or more randomized projections preserve a distance between the n+1 linearly independent anchor points in the first parameter space and the discretized point corresponding to the at least one parameter value with the highest probability of satisfying the at least one behavioral specification in the one or more second abstract parameter space;

verifying that the probability of the discretized point with the highest probability of satisfying the at least one behavioral specification is at least equal to or greater than the minimum probability input by the user;

creating the at least one synthesized parameter value in the first parameter space from the verified discretized point in the second parameter space to satisfy the one or more behavioral specifications observed in the modeled system.

2. The system of claim 1, wherein distances of discretized points from projections of n+1 anchor points are used to identify candidate parameter values in the first parameter space.

3. The system of claim 1, wherein randomized metric embeddings matrices are used to construct the one or more second parameter space.

4. The system of claim 1, wherein the randomized projections are generated by two or more parallel computer processors.

5. The system of claim 1, wherein the modeled system is a physical system.

6. The system of claim 5, wherein the modeled system is a biological system.

7. The system of claim 6, wherein the biological system is described using an agent-based model.

8. The system of claim 7, wherein the at least one synthesized parameter value is a kinetic parameter of the biological system.

9. The system of claim 1, wherein the modeled system is a non-physical system.

10. The system of claim 9, wherein the modeled system is a financial trading system.

11. The system of claim 10, wherein the at least one synthesized parameter value is a risk of at least one asset in an investment portfolio.

12. The system of claim 1, wherein the stochastic computational model is selected from a continuous time Markov chain, a discrete time Markov chain, a stochastic differential equation, and a jump diffusion process.

13. The system of claim 1, wherein the property specification is an adapted finitely monitorable specification.

* * * * *

UNITED STATES PATENT AND TRADEMARK OFFICE
CERTIFICATE OF CORRECTION

PATENT NO. : 9,558,300 B2  
APPLICATION NO. : 13/673575  
DATED : January 31, 2017  
INVENTOR(S) : Sumit K. Jha et al.

Page 1 of 1

It is certified that error appears in the above-identified patent and that said Letters Patent is hereby corrected as shown below:

In the Specification  
Column 13, Line 38: After "space P" insert -- (ii) --

Signed and Sealed this  
Ninth Day of May, 2017

Michelle K. Lee  
*Director of the United States Patent and Trademark Office*